US011095691B2

(12) United States Patent
Zhang et al.

(10) Patent No.: US 11,095,691 B2
(45) Date of Patent: Aug. 17, 2021

(54) METHODS, SYSTEMS, AND COMPUTER READABLE MEDIA FOR ESTABLISHING A COMMUNICATION SESSION BETWEEN A PUBLIC SWITCHED TELEPHONE NETWORK (PSTN) ENDPOINT AND A WEB REAL TIME COMMUNICATIONS (WEBRTC) ENDPOINT

(71) Applicant: Oracle International Corporation, Redwood Shores, CA (US)

(72) Inventors: Shuquan Zhang, Beijing (CN); Weigan Ji, Beijing (CN); Michael David Melo, Framingham, MA (US); Frank Coco, Salem, NH (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 67 days.

(21) Appl. No.: 16/453,952

(22) Filed: Jun. 26, 2019

(65) Prior Publication Data
US 2020/0412770 A1   Dec. 31, 2020

(51) Int. Cl.
*G06F 15/16* (2006.01)
*H04L 29/06* (2006.01)

(52) U.S. Cl.
CPC ...... *H04L 65/1006* (2013.01); *H04L 65/1063* (2013.01); *H04L 65/1069* (2013.01); *H04L 65/608* (2013.01)

(58) Field of Classification Search
CPC ............. H04L 65/1006; H04L 65/1063; H04L 65/1069; H04L 65/608

(Continued)

(56) References Cited

U.S. PATENT DOCUMENTS 6,366,577 B1   4/2002   Donovan
6,714,987 B1   3/2004   Amin et al.
(Continued)

FOREIGN PATENT DOCUMENTS

CN   103414835 A   11/2013
EP   1 142 223 B1   2/2010
(Continued)

OTHER PUBLICATIONS

Notification of Transmittal of the International Search Report and the Written Opinion of the International Searching Authority, or the Declaration for International Application No. PCT/US2020/035002 (dated Aug. 21, 2020).

(Continued)

*Primary Examiner* — Atta Khan
(74) *Attorney, Agent, or Firm* — Jenkins, Wilson, Taylor & Hunt, P.A.

(57) ABSTRACT

A method for establishing a communication session between a public switched telephone network (PSTN) endpoint and a Web real time communications (WebRTC) endpoint includes receiving, by a PSTN microservice (MS), a session initiation protocol (SIP) based signaling message from a PSTN endpoint and acquiring, by the PSTN MS, endpoint context attribute information from the SIP based signaling message. The method further includes generating, by the PSTN MS, a WebRTC based signaling message that includes an address identifier of an associate endpoint (AE) that is associated with the context attribute information and transmitting, by the PSTN MS, the WebRTC based signaling message to the AE to initiate a call session between the PSTN endpoint and the AE.

14 Claims, 3 Drawing Sheets

(58) Field of Classification Search
USPC .......................................................... 709/206
See application file for complete search history.

(56) References Cited

U.S. PATENT DOCUMENTS

| | | | |
|---|---|---|---|
| 7,924,730 | B1 | 4/2011 | McAllister et al. |
| 8,005,087 | B2 | 8/2011 | Dolganow et al. |
| 8,369,334 | B2 | 2/2013 | Yu |
| 8,514,871 | B2 | 8/2013 | Anschutz et al. |
| 8,756,337 | B1 | 6/2014 | Canion et al. |
| 9,037,729 | B2 | 5/2015 | Larkin |
| 9,331,967 | B2 | 5/2016 | Gangadharan et al. |
| 9,503,581 | B2 | 11/2016 | Sayko |
| 9,602,405 | B1 | 3/2017 | Sharma et al. |
| 9,639,714 | B1 | 5/2017 | Carlson et al. |
| 9,648,052 | B2 | 5/2017 | Gangadharan et al. |
| 9,692,911 | B1 | 6/2017 | Chowdhury et al. |
| 9,712,593 | B2 * | 7/2017 | Gangadharan ...... H04L 65/1033 |
| 9,762,533 | B2 * | 9/2017 | Ren .......................... H04L 67/02 |
| 9,819,655 | B1 | 11/2017 | Desai et al. |
| 9,819,719 | B2 | 11/2017 | Hasson et al. |
| 10,095,488 | B2 | 10/2018 | Ebner et al. |
| 10,193,802 | B2 | 1/2019 | Zaidi et al. |
| 10,289,384 | B2 | 5/2019 | Zaidi et al. |
| 10,341,411 | B2 | 7/2019 | Zaidi et al. |
| 10,353,750 | B2 | 7/2019 | P et al. |
| 10,698,880 | B2 | 6/2020 | Patiejunas et al. |
| 2002/0109879 | A1 | 8/2002 | Wing So |
| 2002/0184346 | A1 | 12/2002 | Mani |
| 2003/0088421 | A1 | 5/2003 | Maes et al. |
| 2004/0170156 | A1 | 9/2004 | O'Neill |
| 2004/0196867 | A1 | 10/2004 | Ejzak et al. |
| 2005/0033985 | A1 | 2/2005 | Xu et al. |
| 2005/0073997 | A1 | 4/2005 | Riley et al. |
| 2005/0182843 | A1 | 8/2005 | Reistad et al. |
| 2005/0242973 | A1 | 11/2005 | Liebl et al. |
| 2006/0129650 | A1 | 6/2006 | Ho et al. |
| 2006/0149845 | A1 | 7/2006 | Malin et al. |
| 2009/0044231 | A1 | 2/2009 | Oh et al. |
| 2010/0158009 | A1 | 6/2010 | Lee et al. |
| 2010/0217877 | A1 | 8/2010 | Willars et al. |
| 2011/0228794 | A1 | 9/2011 | Yong et al. |
| 2012/0191847 | A1 | 7/2012 | Nas et al. |
| 2012/0236734 | A1 | 9/2012 | Sampath et al. |
| 2012/0327779 | A1 | 12/2012 | Gell et al. |
| 2013/0128882 | A1 * | 5/2013 | Lawson ............... H04L 65/1013 370/352 |
| 2014/0126714 | A1 * | 5/2014 | Sayko .................. H04L 65/1069 379/265.09 |
| 2014/0222890 | A1 * | 8/2014 | Zhu ........................... G06F 8/31 709/203 |
| 2014/0289303 | A1 * | 9/2014 | Tarricone .............. H04L 65/103 709/201 |
| 2015/0043350 | A1 | 2/2015 | Basilier |
| 2015/0201045 | A1 | 7/2015 | Komirelly et al. |
| 2015/0229635 | A1 * | 8/2015 | Saridaki .................. H04L 67/02 726/8 |
| 2015/0280963 | A1 * | 10/2015 | Bollapalli ........... H04L 12/5692 709/227 |
| 2015/0310087 | A1 | 10/2015 | Tidwell et al. |
| 2015/0319095 | A1 | 11/2015 | Stanwood et al. |
| 2016/0014142 | A1 | 1/2016 | Wang et al. |
| 2016/0019033 | A1 | 1/2016 | Ebner et al. |
| 2016/0077800 | A1 | 3/2016 | Zaidi et al. |
| 2016/0094418 | A1 | 3/2016 | Raney et al. |
| 2016/0219026 | A1 | 7/2016 | Gangadharan et al. |
| 2016/0294786 | A1 | 10/2016 | Marquez Mendoza et al. |
| 2016/0337395 | A1 * | 11/2016 | Bhalerao ............. H04L 63/0236 |
| 2016/0371143 | A1 | 12/2016 | Resch et al. |
| 2017/0126569 | A1 | 5/2017 | Seed et al. |
| 2017/0180565 | A1 | 6/2017 | Chowdhury et al. |
| 2017/0220655 | A1 | 8/2017 | Henrichs et al. |
| 2017/0244628 | A1 | 8/2017 | Chen |
| 2018/0077057 | A1 | 3/2018 | Zaidi et al. |
| 2018/0253342 | A1 | 9/2018 | Gopalakrishnan et al. |
| 2018/0288127 | A1 | 10/2018 | Zaidi et al. |
| 2018/0338002 | A1 | 11/2018 | Sherrill et al. |
| 2019/0042211 | A1 | 2/2019 | Ebner et al. |
| 2020/0293541 | A1 | 9/2020 | Pigeon et al. |

FOREIGN PATENT DOCUMENTS

| | | |
|---|---|---|
| EP | 2 582 124 A1 | 4/2013 |
| EP | 1 882 250 B1 | 3/2016 |
| WO | WO 00/36793 | 6/2000 |
| WO | WO 01/52502 A2 | 7/2001 |
| WO | WO 2004/112335 A1 | 12/2004 |
| WO | WO 2006/124790 A2 | 11/2006 |
| WO | WO-2016/083751 A1 | 6/2016 |
| WO | WO 2016/156256 A1 | 10/2016 |
| WO | WO-2017/129708 A1 | 8/2017 |
| WO | WO 2018/182843 A1 | 10/2018 |
| WO | WO 2020/185891 A1 | 9/2020 |

OTHER PUBLICATIONS

Notification of Transmittal of the International Search Report and the Written Opinion of the International Searching Authority, or the Declaration for International Application No. PCT/US2020/022090 (dated Jun. 17, 2020).

Kaplan Acme Packet, "Requirements for Interworking WebRTC with Current SIP Deployments," Network Working Group, pp. 1-24 (Nov. 22, 2011).

Communication of European Publication Number and Information on the Application on the Application of Article 67(3) EPC for European Patent Application Serial No. 18706337.5 (dated Jan. 9, 2020).

"OnSIP for WebRT Developers," The Business Voice, OnSIP, Junction Networks, pp. 1-4 (2019).

Non-Final Office Action for U.S. Appl. No. 16/352,738 (dated Sep. 30, 2020).

Notice of Allowability for U.S. Appl. No. 15/473,519 (dated May 23, 2019).

Notice of Allowability for U.S. Appl. No. 15/473,519 (dated Mar. 25, 2019).

Commonly-assigned, co-pending U.S. Appl. No. 16/352,738 for "Methods, Systems, and Computer Readable Media for Data Translation Using a Representational State Transfer (REST) Application Programming Interface (API)," (Unpublished, filed Mar. 13, 2019).

Notice of Allowance and Fee(s) Due and Examiner-Initiated Interview Summary for U.S. Appl. No. 15/473,519 (dated Feb. 6, 2019).

Notice of Allowance and Fee(s) Due and Examiner-Initiated Interview Summary for U.S. Appl. No. 14/485,147 (dated Jan. 2, 2019).

Applicant-Initiated Interview Summary for U.S. Appl. No. 15/473,519 (dated Nov. 20, 2018).

Notice of Allowance and Fee(s) Due for U.S. Appl. No. 15/267,997 (dated Sep. 18, 2018).

Non-Final Office Action for U.S. Appl. No. 15/473,519 (dated Sep. 7, 2018).

Non-Final Office Action for U.S. Appl. No. 14/485,147 (dated Jun. 6, 2018).

Notification of Transmittal of the International Search Report and the Written Opinion of the International Searching Authority, or the Declaration for the International Application No. PCT/US2018/016042 (dated Apr. 30, 2018).

Non-Final Office Action for U.S. Appl. No. 15/267,997 (dated Apr. 18, 2018).

Bray, "The JavaScript Object Notation (JSON) Data Interchange Format," Internet Engineering Task Force (IETF), Request for Comments: 8259, pp. 1-16 (Dec. 2017).

Advisory Action, Applicant-Initiated Interview Summary, and AFCP 2.0 Decision for U.S. Appl. No. 14/485,147 (dated Oct. 25, 2017).

Final Office Action for U.S. Appl. No. 14/485,147 (dated Jul. 31, 2017).

Non-Final Office Action for U.S. Appl. No. 14/485,147 (dated Dec. 29, 2016).

(56) References Cited

OTHER PUBLICATIONS

"Oracle® Communications Billing and Revenue Management," Developer's Guide, Release 7.5, E16702-16, Oracle, pp. 1-770 (Aug. 2016).
Donovan, "Diameter Routing Message Priority," RFC 7944, pp. 1-18 (Aug. 2016).
Jamil et al., "Malicious Code Detection using Deep Packet Inspection," Riphah Institute of System Engineering (RISE) Islamabad, Pakistan, https://www.academia.edu/8054586/Malicious_Code_Detection_using_Deep_Packet_Inspection?auto=download, p. 1-8 (at least as early as Jul. 2016).
Fajardo et al., "Diameter Base Protocol," RFC 6733, pp. 1-152 (Oct. 2012).
Li et al., "Cloud Transcoder: Bridging the Format and Resolution Gap between Internet Videos and Mobile Devices," NOSSDAV' 12, pp. 33-38 (Jun. 7-8, 2012).
"WebRTC Gateway for Enterprise," Ribbon Communications Operating Company Inc., pp. 1-6 (2019).
"What is SIP Interconnect?," tokbox, pp. 1-3 (2019).
"In order for the OpenTok SIP Interconnect to work you need to configure your SIP gateway to interoperate with the OpenTok platform," pp. 1-1 (2019).
"OpenTok is the leading WebRTC platform for interactive video, enabling voice, video and messaging for mobile and web with our Live Video API," pp. 1-1 (2019).
"WebRTC Gateway Extend the capabilities of existing infrastructure without costly upgrades or new hardware purchases," Twilio, pp. 1-11 (2019).
"Embed IP communications into a web interface," Twilio, pp. 1-8 (2019).
"WebRTC to SIP calling: How to Call a Desk Phone From a WebRTC-enabled Browser," Junction Networks, pp. 1-4 (2019).
"SIP Signalling for WebRTC Apps," Junction Networks, pp. 1-4 (2019).
"WebRTC: The Next Innovation in Communication," Junction Networks, pp. 1-4 (2019).
"WebRTC to PSTN: Making Calls to and From the PSTN With WebRTC," Junction Networks, pp. 1-3 (2019).
"Solution Design Guide for Cisco Unified Contact Center Enterprise, Release 11.5" Cisco, pp. 1-108 (Jan. 3, 2018).
"WebRTC Voice," RingCentral, Inc. pp. 1-1 (2018).
"CRM Integration," RingCentral, Inc., pp. 1-2 (2018).
"3X Customize Solutions with Mr.VoIP University Tool," Mr VoIP, pp. 1-4 (2018).
"Amazon Connect CTI Adapter: CTI Contact Center IVR ACD Call Recording," Amazon Web Services, pp. 1-1 (Sep. 20, 2018).
"Amazon Connect and Salesforce Integration", Amazon Web Services, Inc., pp. 1-3 (2018).
Roopika, et al., "Real Time Communications Between Mobile and Web Browser," International Journal of Advance Research, Ideas, and Innovations in Technology, vol. 4, Issue 3, pp. 1286-1289 (2018).
Rudkowski, Marc, "Enabling Amazon Connect with Salesforce Service Cloud and Sales Cloud", Amazon, pp. 1-11 (Sep. 12, 2017).
"Sonus Enables WebRTC & SIP/PSTN/IMS Integration," Ribbon Communications Operating Company Inc., pp. 1-4 (Mar. 16, 2015).
"When WebRTC and SIP Worlds Intersect . . . ," Ribbon Communications Opearitng Company Inc., pp. 1-4 (Jul. 22, 2013).
"Flowroute Connects FreeSWITCH WebRTC Platform to the World," Flowroute, pp. 1-3 (Jun. 24, 2013).
Pleasant, Robbie "FreeSWITCH Selects Flowroute for PSTN-WebRTC Interopearbility," WebRTC World, Technology Marketing Corp., pp. 1-10 (Jun. 24, 2013).
Kelly, Brent "WebRTC Integration with Enterprise and Public Communications Infrastructure," No Jitter, pp. 1-7 (Jun. 5, 2013).
Notice of Allowance and Fee(s) Due & Examiner-Initiated Interview Summary for U.S. Appl. No. 14/973,625 (dated Feb. 2, 2017).
Office Action for Canadian Patent Application Serial No. 2 608 641 (dated Jan. 9, 2017).
Non-Final Office Action for U.S. Appl. No. 14/973,625 (dated Sep. 8, 2016).
"Universal Mobile Telecommunications System (UMTS); LTE; Policy and charging control over Rx reference point (3GPP TS 29.214 version 10.3.0 Release 10)," ETSI TS 129 214 V10.3.0, pp. 1-52 (Jun. 2011).
Letter regarding Examiner's first report for Australian Patent Application No. 2006347431 (dated Nov. 19, 2009).
Final Office Action for U.S. Appl. No. 11/435,380 dated Jul. 13, 2009.
Non-Final Office Action for U.S. Appl. No. 11/435,380 dated Oct. 27, 2008.
International Search Report, corresponding to PCT Application No. US06/18758, dated Aug. 22, 2007.
"Camiant's Policy Server," Products, Camiant: The Leader in Policy Control (Feb. 8, 2007). http://web.archive.org/web/20070208062144/ http://www.camiant.com/products2.shtml.
Hadnely et al., "SDP: Session Description Protocol," RFC 4566, pp. 1-49 (Jul. 2006).
Rosenberg et al., "Best Current Practices for Third Part Call Control (3pcc) in the Session Initiation Protocol (SIP)," Network Working Group, RFC 3725 (Apr. 2004).
"PacketCable™ Multimedia Architecture Framework," Technical Report, PKT-TR-MM-ARCH-V01-030627 (2003).
Rosenberg et al., "An Offer/Answer Model with the Session Description Protocol (SDP)," Network Working Group, RFC 3264 (Jun. 2002).
Handley et al., "SDP: Session Description Protocol," Network Working Group, RFC 2326 (Apr. 1998).
Office Action for Canadian Patent Application Serial No. 2 608 641 (dated Apr. 26, 2016).
Office Action for Canadian Patent Application Serial 2 608 641 (dated Jun. 4, 2015).
Intent to grant a European Patent Application No. 06 759 859.9 (dated Oct. 27, 2015).
Office Action for Canadian Patent Application Serial No. 2 608 641 (dated May 16, 2014).
Communication pursuant to Article 94(3) EPC for Euroepean Patent Application No. 06 759 859.9 (dated Jun. 4, 2013).
Office Action for Canadian Patent Application Serial No. 2 608 641 (dated May 31, 2013).
Communication pursuant to Article 94(3) EPC for European Patent Application No. 06 759 859.9 (dated Feb. 14, 2012).
Communication pursuant to Article 94(3) EPC for European Patent Application No. 06 759 859.9 (dated Apr. 20, 2011).
Communication of the extended European search report for European Patent Application No. 06759859.9 (dated Aug. 24, 2010).
Goulart et al., "On overlapping resource management and call setup signaling:a new signaling approach for internet multimedia applications," Computer Communications 25, pp. 851-863 (2005).
Marshall et al., "Architectual Considerations for Providing Carrier Class Telephony Services Utilizing Session Initiation Protocol (SIP)-based Distributed Call Control Mechanisms," Sipping Working Group, Internet Draft, Category: Informational, pp. 1-22 (Jan. 15, 2003).

* cited by examiner

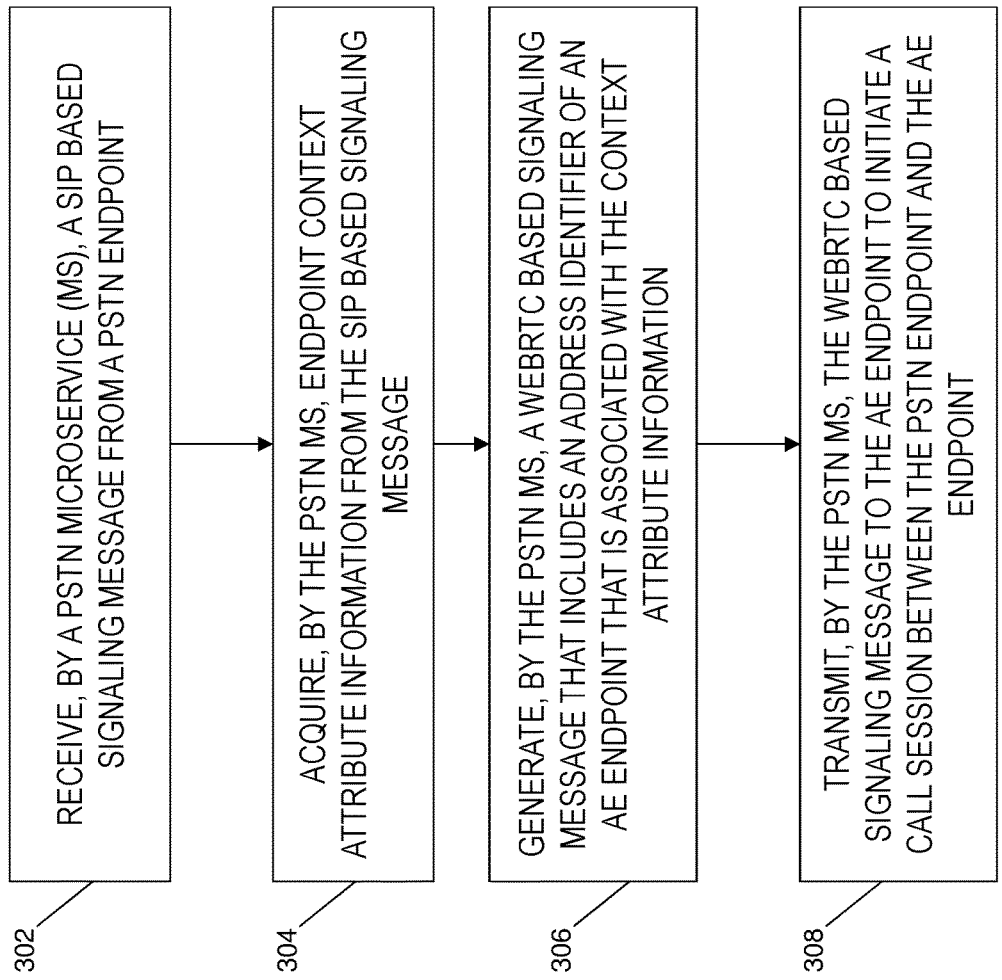

METHODS, SYSTEMS, AND COMPUTER READABLE MEDIA FOR ESTABLISHING A COMMUNICATION SESSION BETWEEN A PUBLIC SWITCHED TELEPHONE NETWORK (PSTN) ENDPOINT AND A WEB REAL TIME COMMUNICATIONS (WEBRTC) ENDPOINT

TECHNICAL FIELD

The subject matter described herein relates to enabling real time communications between public switched telephone network (PSTN) users and Web real time communications (WebRTC) users. More particularly, the subject matter described herein relates to methods, systems, and computer readable media for establishing a communication session between a PSTN endpoint and a WebRTC endpoint.

BACKGROUND

Presently, web-based applications and instant messaging clients are frequently used to communicate media and messages over the Internet. Likewise, PSTN phone based telecommunications are commonly employed to establish voice-based call sessions. Notably, each of these different network systems normally requires that all supported endpoints establish a connection to a call center or server using a common protocols, a common software client, and the like. In instances where communication between a WebRTC endpoint and a PSTN-based endpoint is desired, problems can arise due to incompatible signaling protocols and/or the inability of the different terminal device to reliably share endpoint information. In particular, it is important for a WebRTC application to have knowledge of some particular details of the endpoint with which the application is communicating. Further, additional technical challenges can develop when WebRTC endpoints attempt to interwork with PSTN endpoints, since a WebRTC based system largely enables the communication of real time media using secure real time protocol (SRTP), which is not used by PSTN endpoints or systems.

Accordingly, there exists a need for methods, systems, and computer readable media for establishing a communication session between a PSTN endpoint and a WebRTC endpoint.

SUMMARY

The subject matter described herein includes a methods, systems, and computer readable media for establishing a communication session between a PSTN endpoint and a WebRTC endpoint. One method includes receiving, by a PSTN microservice (MS), a session initiation protocol (SIP) based signaling message from a PSTN endpoint and acquiring, by the PSTN MS, endpoint context attribute information from the SIP based signaling message. The method further includes generating, by the PSTN MS, a WebRTC based signaling message that includes an address identifier of an associate endpoint (AE) that is associated with the context attribute information and transmitting, by the PSTN MS, the WebRTC based signaling message to the AE to initiate a call session between the PSTN endpoint and the AE.

In one example of the method, the PSTN MS initiates a WebSocket connection with a signaling engine (SE) in response to receiving the SIP based signaling message.

In one example, the method further includes acquiring the endpoint context attribute information including parsing a header section of the SIP based signaling message to obtain origin and/or destination information and call type information that is used to generate the endpoint context attribute information.

In one example of the method, the address identifier of the AE is acquired in response to pushing the endpoint context attribute information to an associate microservice associated with the AE via a representation state transfer (REST) application programming interface (API).

In one example of the method, the PSTN MS sends a join queue request to the AE in response the endpoint context attribute information is pushed via the REST API.

In one example of the method, the PSTN MS converts the SIP signaling message to a JavaScript Object Notation (JSON) protocol signaling message that is recognized by the AE.

In one example of the method, the JSON protocol signaling message is a conversation start request message that initiates the call session with the AE.

A system for establishing a communication session between a PSTN endpoint and a WebRTC endpoint includes a cloud communication environment (CCE) comprising at least one processor and memory. The system further includes a PSTN MS stored in the memory and when executed by the at least one processor is configured to receive a SIP based signaling message from a PSTN endpoint, acquire endpoint context attribute information from the SIP based signaling message, generate a WebRTC based signaling message that includes an address identifier of an AE that is associated with the context attribute information, and transmit the WebRTC based signaling message to the AE to initiate a call session between the PSTN endpoint and the AE.

In one example of the system, the PSTN MS initiates a WebSocket connection with a signaling engine (SE) in response to receiving the SIP based signaling message.

In one example of the system, the PSTN MS is further configured to parse a header section of the SIP based signaling message to obtain origin and/or destination information and call type information that is used to generate the endpoint context attribute information.

In one example of the system, the address identifier of the AE is acquired in response to pushing the endpoint context attribute information to an associate microservice associated with the AE via a REST API.

In one example of the system, the PSTN MS sends a join queue request to the AE in response the endpoint context attribute information is pushed via the REST API.

In one example of the system, the PSTN MS converts the SIP signaling message to a JavaScript Object Notation (JSON) protocol signaling message that is recognized by the AE.

In one example of the system, the JSON protocol signaling message is a conversation start request message that initiates the call session with the AE.

The subject matter described herein may be implemented in hardware, software, firmware, or any combination thereof. As such, the terms "function" "node" or "engine" as used herein refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

FIG. 3 is a flow chart illustrating an exemplary process for establishing a communication session between a PSTN endpoint and a WebRTC endpoint according to an embodiment of the subject matter described herein.

DETAILED DESCRIPTION

Methods, systems, and computer readable media for establishing a communication session between a public switched telephone network (PSTN) endpoint and Web real time communications (WebRTC) endpoint are disclosed. In some embodiments, the disclosed subject matter includes an external PSTN endpoint that is permitted to communicate with a web-based associate endpoint (AE). In such instances, a protocol translation is needed to initiate and establish a call or communication session. A host system, such as a cloud communication environment (CCE) utilizes a plurality of microservices (e.g., virtual machines and/or software applications) that are collectively configured to accept an inbound session initiation protocol (SIP) INVITE message from outside the CCE and subsequently translate a SIP INVITE message to a signaling message based on the JavaScript Object Notation (JSON) RTC protocol. By doing so, the receiving AE can promptly accept the incoming call in a seamless manner (e.g., function as if the call originated from an another AE). The CCE system is also configured to push related context attribute information pertaining to the sending PSTN endpoint to notify the destination AE that the call signaling message is originating from an endpoint supported in the PSTN system (e.g., "callType: PSTN").

Figure 1:
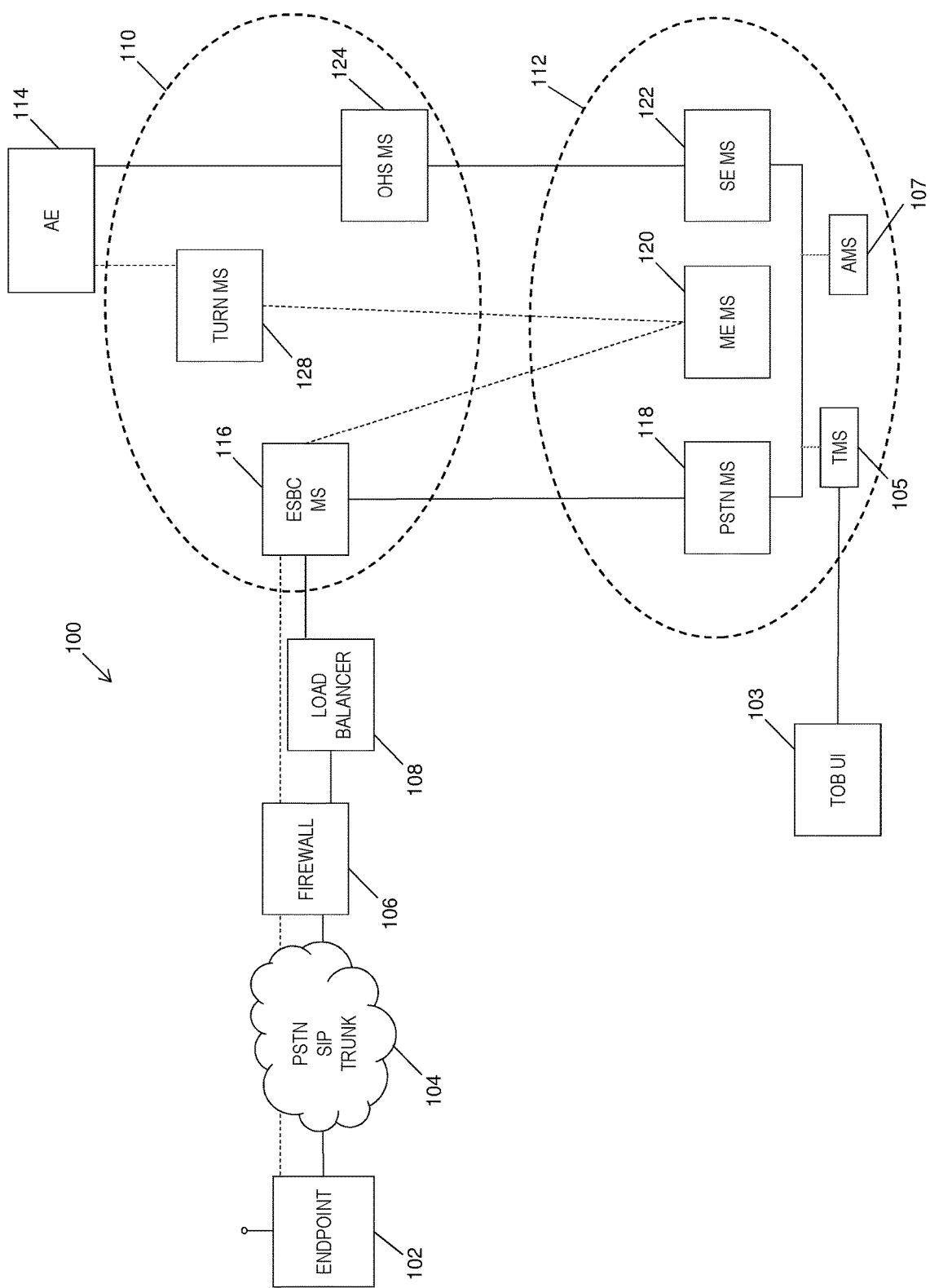
FIG. 1 is a block diagram illustrating an exemplary network for establishing a communication session between a PSTN endpoint and a WebRTC endpoint according to an embodiment of the subject matter described herein.

FIG. 1 is a block diagram illustrating an exemplary network for establishing a communication session between a PSTN endpoint and a WebRTC endpoint according to an embodiment of the subject matter described herein. For example, FIG. 1 depicts a network 100 that includes a PSTN endpoint 102, a PSTN SIP trunk 104, a firewall 106, a load balancer 108, and a CCE system that comprises at least one external host domain 110 and at least one internal host domain 112.

In some embodiments, PSTN endpoint 102 comprises a mobile device, user equipment, Voice over IP (VoIP) phone, or the like that is capable of communicating over a PSTN network (e.g., PSTN SIP trunk 104). Notably, endpoint 102 is configured to communicate and establish sessions using SIP and session description protocol (SDP) signaling messages. In particular, PSTN endpoint 102 may attempt to establish a call session with a WebRTC endpoint, such as AE 114, by directing a SIP INVITE message toward external host domain 110. In some embodiments, AE 114 may comprise any WebRTC endpoint, such as a desktop device, a laptop device, a mobile device (e.g., iOS, Android, etc.), or the like.

The SIP INVITE message sent by PSTN endpoint 102 is initially received by a firewall 106 via PSTN SIP trunk 104. Notably, firewall 106 can provide network address translation (NAT) services of the public facing Internet protocol (IP) network (e.g., 129.146.x.x) for the private network (e.g., 10.0.x.x), which the devices and/or microservices of external host domain 110 are connected. In some embodiments, firewall 106 is a bare metal as a service (BMaaS) firewall.

After successfully passing through firewall 106 (e.g., via a particular port), the SIP INVITE message is received by load balancer 108. In some embodiments, load balancer 108 is configured to distribute one or more PSTN calls across the host devices and/or microservices of external host domain 110, which may be configured as a set of back-end servers and/or virtual machines. For example, load balancer 108 is adapted to select one of a plurality of enterprise session Border Controller (ESBC) microservices (e.g., ESBC MS 116) hosted in the external host domain 110 of the CCE system to process any incoming SIP INVITE messages. In some embodiments, the IP address of load balancer 108 is provisioned in the PSTN SIP trunk 104. For example, the existing 10.0.x.x private network address can be used to carry the PSTN signaling and media traffic. Because ESBC MS 116 is positioned behind firewall 106, ESBC MS 116 is configured for NAT traversal such that the SIP and media negotiations reflect the public side IP address of firewall 106. More specifically, during SIP and media negotiations, the PSTN endpoint 102 will be presented with the BMaaS public facing IP address to reach the ESBC MS 116 in the external host domain 110.

In some embodiments, external host domain 110 comprises one or more hardware devices that are configured to support and execute ESBC MS 116, TURN MS 128, and OHS MS 124. For example, external host domain 110 may can be implemented in software in combination with hardware and/or firmware. Notably, the subject matter described herein can be implemented in software executed by a processor. In one exemplary implementation, external host domain 110 may include one or more processors, such as a central processing unit (e.g., a single core or multiple processing cores), a microprocessor, a microcontroller, a network processor, an application-specific integrated circuit (ASIC), or the like. External host domain 110 may also include memory. Memory may comprise random access memory (RAM), flash memory, a magnetic disk storage drive, and the like. In some embodiments, memory may be configured to store one or more microservices. In some embodiments, the processor(s) and memory may be managed by a hypervisor to serve as the underlying hardware for supporting virtual machine(s) (VMs) that support the aforementioned microservices 116, 124, 128 that are supported in external host domain 110.

As shown in FIG. 1, ESBC MS 116 is configured to receive signaling communications from PSTN SIP trunk 104 via firewall 106 and load balancer 108. For example, ESBC MS port '5061' can be publicly exposed and adapted to accept SIP over TLS connections. ESBC MS 116 is configured to terminate the PSTN side of the call session and subsequently load balance the SIP INVITE message to a plurality of back end PSTN microservices (e.g., PSTN MS 118). In some embodiments, ESBC MS 116 is configured to utilize a round-robin load balancing method. In alternate embodiments, ESBC MS 116 can support other types of algorithms or methods to load balance signaling messages directed to AEs as the need arises. After selecting the appropriate PSTN microservice, ESBC MS 116 can establish a secure connection with PSTN MS 118 using transport layer security (TLS), secure sockets layer (SSL), Transmission control protocol (TCP)/IP, or the like.

In some embodiments, EBSC MS 116 is configured to provide the necessary security for the PSTN traffic received by the CCE. For example, ESBC MS 116 may secure the SIP signaling plane by requiring SIP over TLS communication when communicating with a PSTN service provider (e.g., via PSTN SIP trunk 104). Likewise, ESBC MS 116 can also be configured to secure the media plane by requiring encryption of all media traffic using secure real-time transport protocol (SRTP). In addition to utilizing SRTP, ESBC MS 116 can provide protection for the exposed media ports against denial of service (DoS), distributed denial of service (DDoS) attacks, and man-in-the-middle attacks. In some embodiments, ESBC MS 116 can run as a kernel-based virtual machine (KVM) instance in the CCE external host domain, not unlike the OHS MS 124 and TURN MS 128.

In some embodiments, ESBC MS 116 can be used as a public facing service that is configured to negotiate the SIP signaling and media signaling required to establish a PSTN call through the CCE. As indicated above, ESBC MS 116 can be provisioned as a KVM instance on one or more devices/servers in external host domain 110. The external host domain(s) are deployed behind a BMaaS firewall 106 and load balancer 108. Firewall 106 provides network address translation (NAT) services for the IP network (129.146.x.x) that is public facing to the private network (10.0.x.x), which the external hosts are connected in external host domain 110. In some embodiments, External host domain 110 will be provisioned with at least one firewall rule that permits incoming packet traffic originating from the PSTN service provider's SIP port (and a range of media ports) and forwards that traffic to the 10.0.x.x private interface of ESBC MS 116. Further, a PSTN service provider can be configured with a BMaaS load balancer IP address in order to direct communications toward the CCE. For example, BMaaS load balancer 108 can distribute incoming calls across one or more backend servers (and/or microservices) of external host domain 110. The existing IP address of the BMaaS load balancer 108 can be provisioned in the PSTN SIP trunk 104 to reach the CCE service. The existing 10.0.x.x private network will be used to carry the PSTN signaling and media traffic.

Because the ESBC MS 116 is behind BMaaS firewall 106, ESBC MS 116 will be configured for NAT traversal so that the SIP and media negotiations reflect the public side IP address of BMaaS firewall 106. Specifically, during SIP and media negotiations, PSTN endpoints (e.g., endpoint 102) will be presented with the BMaaS public facing IP address that can be used to establish contact with the ESBC MS 116.

For the SIP signaling traffic, ESBC MS 116 can be configured to distribute the load among a plurality of PSTN microservices (e.g., PSTN MS 118) in the internal host domain 112. For the media traffic, ESBC MS 116 can forward the packet traffic to a backend media engine (ME) server (e.g., a ME microservice 120), which will then direct the media traffic to the next hop (e.g., a TURN server and/or microservice 128) for delivery to the associate endpoint (e.g., AE 114). It is understood that the existing ME microservices can support a mix of MCU and SFU sessions.

In some embodiments, ESBC MS 116 is configured to perform SIP trunking terminations, TLS and SRTP support, advanced DOS and overload protection, NAT support (e.g., when the ESBC MS is positioned behind a firewall), KVM support, and routing SIP message to a backend set of servers. ESBC MS 116 is further configured to conduct 1:1 optional high availability (HA) support, supports all the relevant PSTN and ME related codecs, and is capable of supporting 12000 signaling sessions, 6000 SRTP sessions, and 2500 transcoded sessions (G.721↔G.729).

In some embodiments, the ESBC MS forwards the load balanced SIP INVITE message to a selected/designated PSTN MS 118 that is positioned in the internal host domain 112 of the CCE. In some embodiments, internal host domain 112 may comprise one or more hardware devices that are configured to support and execute tenant MS 105, associate MS 107, PSTN MS 118, ME MS 120, and SE MS 122. For example, internal host domain 112 may be implemented in software in combination with hardware and/or firmware. Notably, the subject matter described herein can be implemented in software executed by a processor. In one exemplary implementation, internal host domain 112 may include one or more processors, such as a central processing unit (e.g., a single core or multiple processing cores), a microprocessor, a microcontroller, a network processor, an application-specific integrated circuit (ASIC), or the like. Internal host domain 112 may also include memory. Memory may comprise random access memory (RAM), flash memory, a magnetic disk storage drive, and the like. In some embodiments, memory may be configured to store one or more microservices. In some embodiments, the processor(s) and memory may be managed by a hypervisor to serve as the underlying hardware for supporting virtual machine(s) (VM) that support the aforementioned microservices 105-107 and 118-122.

In some embodiments, PSTN MS 118 is configured to handle SIP requests received from outside the CCE (via ESBC MS 116). As an example, PSTN MS 118 can support a SIP-related call setup method and signaling messages, such as SIP INVITE, UPDATE, ACK, BYE, and CANCEL messages. In some embodiments, PSTN MS 118 can also be configured to implement a SipServlet to handle a SIP INVITE request.

After receiving an initial SIP INVITE message, PSTN MS 118 is configured to i) retrieve a tenant key and/or a client identifier based on the target phone number (i.e., called party phone number), ii) generate a JWT token, iii) establish a connection to SE MS 122 via a WebSocket, iii) parse 'from' and 'to' headers of a received SIP INVITE and generate endpoint context attribute information, and iv) push the endpoint context attribute data to an associate MS 107 via a REST API. In some embodiments, associate MS 107 contains a plurality of routing rules that can be used to establish the connection between a PSTN endpoint and a target AE via PSTN MS 118. Notably, in order to route the PSTN call to the correct associate or correct team (e.g., AE 114), routing rules need to be initially configured by a tenant administrator on TOB UI 103. A provisioned routing rule can be based on a target PSTN number, e.g., calls directed to "+01234" will be routed to mceAgent@example.com. Alternatively, the routing rule can also be based on the originating number of PSTN endpoint 102 (e.g., a call from "+64xxx" may be routed to the "NZ support team"). Based on the associate name returned to PSTN MS 118 by the associate MS 107, PSTN MS 118 can translate or convert the SIP INVITE message to initiate a communication session with a target (e.g., AE) associated with an associate name. As such, this request will be sent to the correct associate or AE. For example, PSTN MS 118 may be further configured to v) send a join queue REST request message after the context attribute information is successfully pushed to the associate MS 107, and vi) create a conversation inquiry request and send the message to SE MS 122. After obtaining an inquiry/response, create a conversation start/request message with the related AE information. After obtaining a start/response message, PSTN MS 118 creates a SIP 200 response message for the initial SIP INVITE request sent by the PSTN endpoint 102. More specifically, when the AE responds with the answer SDP, PSTN MS 118 may generate a SIP 200 message with an answer SDP for the original/initial SIP INVITE request sent by PSTN endpoint 102.

In some embodiments, PSTN MS 118 receives a SIP CANCEL message before a call is answered and is configured to send a cancel "joinQueue request" to associate MS 107 and may also close the WebSocket with SE MS 122. PSTN MS 118 then receives the SIP CANCEL message after AE 114 answers, but SIP 200 messages are not delivered to the PSTN client (e.g., PSTN endpoint 102). In such instances, PSTN MS 118 will send a shutdown message to the SE MS 122 and close the WebSocket.

In some embodiments, AE 114 is configured to communicate via PSTN MS 118 using WebRTC, which is a protocol that enables real-time communication in a hosted browser (as defined in IETF and W3C standards). As indicated above, endpoints that are configured to communicate in WebRTC present some technical challenges in instances where communication with a PSTN endpoint is desired. For example, WebRTC enables the secure communication of real time media using SRTP. However, this protocol is not largely recognized and/or utilized by PSTN networks. In order to address this technical problem, the disclosed subject matter describes a method that provides for a push contextAPI, JavaScript Conversation SDK, and JSON RTC protocol. As such, the disclosed subject matter enables developers to readily construct applications that provide an interworking service for both PSTN users and WebRTC users.

In some embodiments, ESBC MS 116 is configured to negotiate a media session with a PSTN service via PSTN SIP trunk 104 (after the signaling session is initiated). Notably, a range of ESBC media ports can be exposed by ESBC MS 116. As such, media traffic arriving at the exposed ESBC media ports will be subjected to network address translation (NAT) by firewall 106 to the private IP address of the external host domain 110. In some embodiments, external host domain 110 will have a firewall rule provisioned to port forward the range of media ports to the ESBC MS 116. Once the ESBC MS 116 receives the PSTN media traffic, ESBC MS 116 will forward the media traffic to ME MS 120 for delivery to AE 114. The media path existing between PSTN SIP trunk 104 and ESBC MS 116 may use SRTP to provide confidentiality, message authentication, and replay protection for the communicated media traffic. In addition to SRTP, ESBC MS 116 can provide security and protection for the publicly exposed ESBC media ports against DOS attacks, DDOS attacks, and man-in-the-middle attacks. However, ESBC MS 116 will not provide any transcoding functionality. Rather, ME MS 120 will be responsible for any transcoding that may be required for the media traffic associated with the established call between PSTN endpoint 102 and AE 114.

In some embodiments, the disclosed subject matter can be configured to implement a number of security measures. In some embodiments, PSTN MS 118 requires a range or plurality of media ports to be exposed to the public side of the CCE system. Notably, the ME MS does not provide any DOS/DDOS or man-in-the-middle protection of the exposed media ports. As such, it is important for the CCE service to protect these media ports from external attacks. Therefore, the aforementioned ESBC MS 116 is configured to terminate the PSTN SIP trunk as a SIP message enters the CCE. ESBC MS 116 will act as a back-to-back user agent (b2bua) providing security on the public PSTN side and as an interface to PSTN MS 118, which is positioned in the internal host domain 112 of the CCE. In some embodiments, the ESBC security is achieved by supporting TLS for SIP signaling and supporting SRTP for the media path, as well as protecting against DOS/DDOS and man-in-the-middle attacks. For example, ESBC MS 116 provides protection from possible TCP/TLS message flooding by limiting the number of connections from an endpoint, and by limiting the number of simultaneous TCP/TLS connections to a SIP interface. For example, ESBC MS 116 can use a 'StaticTLS' connection to the PSTN SIP trunk 104, which means a single TLS connection is established from PSTN service provider to the CCE system. Notably, the signaling of all calls will designated to use that single TLS connection. Once a call is established, if a SIP signaling event is initiated from the CCE side (e.g., the AE), then it is possible that the CCE system will need to initiate a new TLS connection back to a PSTN endpoint supported by the PSTN service provider. For example, the connection can be made to the IP:port that was sent by a PSTN service provider in the Contact header of the initial SIP INVITE message. Therefore, a policy mandating a soft limit of TLS connections over the access side SIP interface may be enforced by ESBC MS 116.

Furthermore, ESBC MS 116 can be configured to provide security measures for signaling messages. For example, a single port can be opened at firewall 106 and ESBC MS 116 in order to accommodate the receiving of SIP signaling messages. For example, a new port (e.g., 5061) can be opened for SIP over TLS communication. Likewise, a plurality of ports can be opened at firewall 106 and ESBC MS 116 in order to facilitate the accommodating of media traffic. For example, ESBC MS 116 can be installed in external host domain 110 and a range of ports (e.g., UDP ports 49152-60152) can be opened for media traffic (in both firewall 106 and ESBC MS 116) in the external host domain 110, such that an external PSTN phone (e.g., endpoint 102) can communicate with AE 114. In some embodiments, the media connection established between the PSTN SIP trunk 104 and ESBC MS 116 will be required to use SRTP to provide confidentiality, message authentication, and replay protection for the communicated media traffic.

In some embodiments, ESBC MS 116 is configured to provide signaling and media encryption. For example, the ESBC access side interface to the PSTN service provider (e.g., PSTN SIP trunk 104) uses TLS to ensure the confidentiality of the SIP signaling layer. Likewise, the ESBC access side media layer uses SRTP to provide confidentiality, message authentication, and replay protection for the media path. In addition to TLS and SRTP, the PSTN service provider is provisioned to only accept calls from the BMaaS public IPs corresponding to the CCE system. Attempts to connect to the PSTN SIP trunk 104 from other non-CCE IPs will be rejected by the PSTN service provider. Similarly, CCE has provisioned security lists that only allow external access to the signaling and media ports from specific PSTN service provider public IPs that are provisioned solely for the CCE service. Access to the signaling/media ports from sources other than the PSTN service provider IP addresses will be rejected by ESBC MS 116.

In some embodiments, ESBC MS 116 provides further protection internally within the CCE network by only allowing connections from configured 'session-agents'. A 'session-agent' in ESBC terminology is a SIP hop that ESBC MS 116 communicates with, so CCE has one session-agent for the access side (i.e., the external host domain IP address), and one for each supported PSTN MS. The ESBC MS 116 only allows SIP dialogs from these configured session-agents and rejects attempts from all other IPs.

As shown in FIG. 1, network 100 further includes a tenant on-boarding (TOB) administrator user interface (UI) 103. Using this interface, a tenant administrator user can provision and configure PSTN rules for each of a plurality of tenants and/or associate entities (i.e., system subscribers). For example, a tenant administrator can utilize TOB UI 103 (which may be embodied as a browser application hosted and executed by a user computing device) to add context attribute data in a tenant configuration table. The tenant administrated can subsequently configure PSTN rules on TOB UI 103 with the new defined context attribute for one or more tenants or associates. Notably, the context attribute data that is provisioned using TOB UI 103 can be used to configure a PSTN provider/vendor to be able to route PSTN calls to AEs supported by the CCE system. For example, TOB UI 103 can be used to specify an originating PSTN number in a routing rule condition table and specifying an AE as a predefined call destination (e.g., a target phone number). As such, all call signaling messages originating from a particular PSTN endpoint or PSTN vendor can be specifically routed to a particular AE (e.g., a "team").

In some embodiments, the security information configured by the tenant administrator is encrypted before it is stored in a management database. In some embodiments, a DKKey will be used to encrypt the private data. Further, PSTN vendor authentication information will be considered as private information, but tenant subscribed phone numbers can be designated as public information. Further, for cross microservice access, an Auth MS private key is replicated to the PSTN MS domain (e.g., internal host domain 112), and the private key is used to generate a JWT token for a specific TenantKey/ClientId. Notably, the JWT token is used by PSTN MS 118 to access the associate MS 107 and SE MS 122. The use of the JWT token is designated for internal access and no public API is exported.

In some embodiments, the routing rules can be provisioned to one or more tenants by onboarding the rules as RESTful configuration data to a corresponding one or more tenant microservices (TMS) 105. After receiving the configuration data, TMS 105 can send a synchronization message to one or more related associate microservices (AMS) 107. AMS 107 can then use the configuration data to specify specific routing rules for PSTN endpoints associated with the subscribed associate MS or tenant MS.

Figure 2:
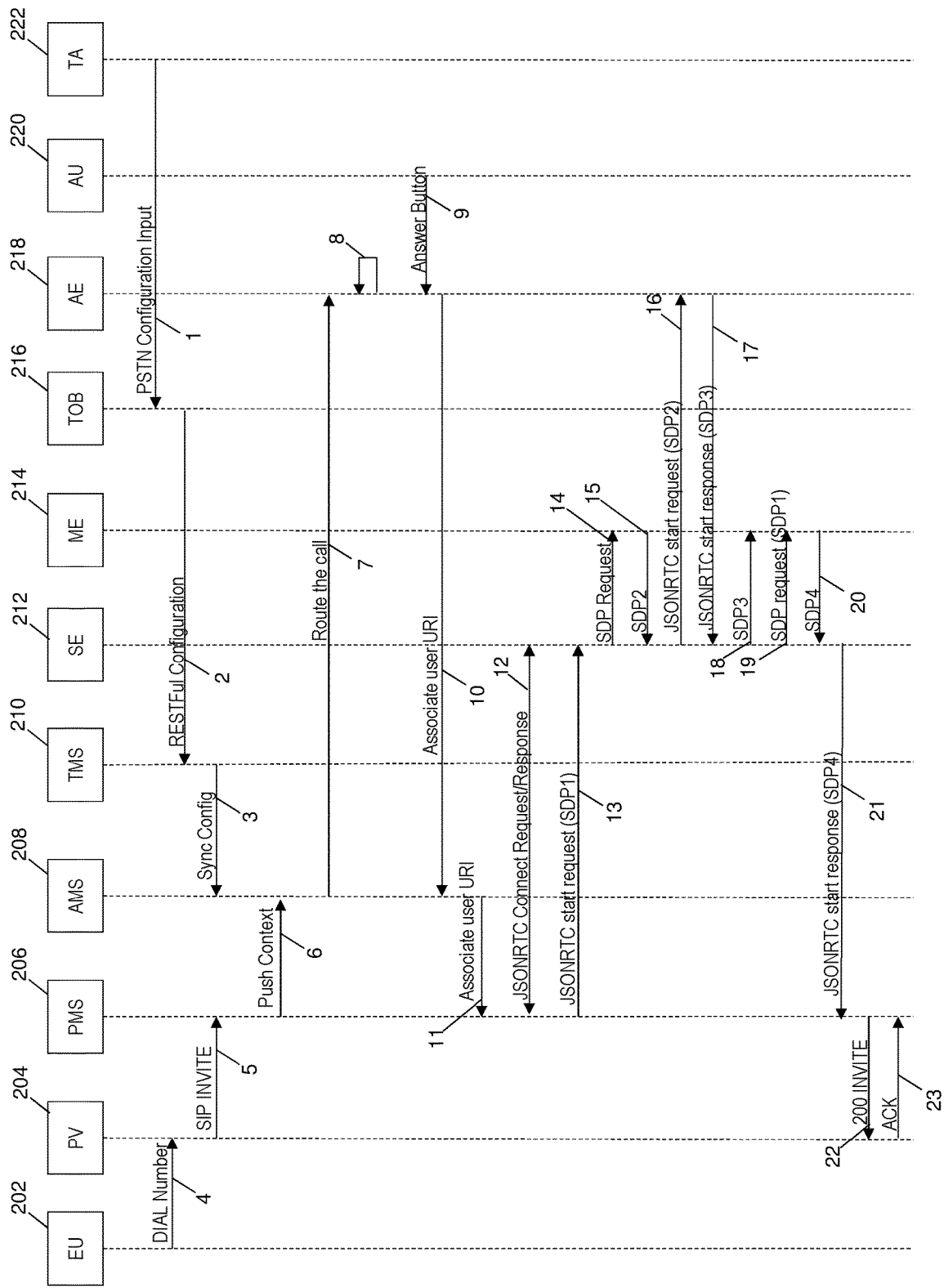
FIG. 2 is a signaling diagram illustrating an exemplary call flow for establishing a communication session between a PSTN endpoint and a WebRTC endpoint according to an embodiment of the subject matter described herein.

FIG. 2 is a signaling diagram illustrating an exemplary call flow for establishing a communication session between a PSTN endpoint and a WebRTC endpoint according to an embodiment of the subject matter described herein. As shown in FIG. 2, a tenant administrator (TA) 222 utilizes a tenant on-boarding (TOB) user interface 216 to provide a PSTN configuration for each of one or more tenant entities (e.g., see message 1). In some embodiments, tenant administrator 222 is a system user or operator that is responsible for managing the tenants that are subscribed to and support by the CCE system. Notably, tenant administrator 222 can update the configuration data for the tenant entities serviced by the CCE system.

In response to the input by tenant administrator 222, TOB UI 216 is configured to send a signaling message that contains RESTful configuration data (for a tenant entity) to a tenant microservice (TMS) 210 (e.g., see message 2). Tenant MS 210 subsequently provides the received configuration information to an associate MS (AMS) 208 for purposes of synchronization (e.g., see message 3). Accordingly, associate MS 208 is thus provisioned with the PSTN configuration information originally designated by the tenant administrator 222 using TOB UI 216.

As shown in FIG. 2, PSTN endpoint 202 is utilized (e.g., by a user) to dial an access number that may correspond to and/or be mapped to an AE 218 (e.g., see message 4). The dialed number information is received by PSTN vendor 204 (e.g., via a PSTN SIP trunk), which in turn generates a SIP INVITE message (e.g., see message 5) that is directed to the external host domain and/or AE 218. After traversing a firewall, load balancer, and designated EBSC MS (see description above and FIG. 1), the SIP INVITE message (e.g., see message 6) is received by a PSTN MS (e.g., PSTN MS 206) that has been selected by the external host network and/or EBSC MS. Notably, PSTN MS 206 extracts endpoint context attribute information from the received SIP INVITE message and provides said data to an associate MS 208 via a push context message.

In some embodiments, associate MS 208 is an agent application initially created by tenant administrator 222 and is responsible for answering calls from PSTN endpoints. In some embodiments, PSTN MS 206 provides the endpoint context attribute information to associate MS 208 using a push context message (e.g., pushContext/getAgentUri message) sent via a REST API (e.g., see message 6). Notably, the endpoint context attribute information can be generated by PSTN MS 206 using information extracted from the header of the received SIP INVITE message. For example, the endpoint context attribute information can include the "From" or "To" information contained in the header of the SIP INVITE message.

In some embodiments, associate MS 208 is responsible for determining which AE should be selected to answer the call request from PSTN endpoint 202. Upon receiving the push context message (e.g., see message 6), associate MS 208 may be configured to access local routing rules that indicate the AE that is to be designated as the target. As indicated above, the routing rules can designate a target AE based on data contained in the endpoint context attribute information provided by the PSTN MS 206. In some embodiments, associate MS 208 may cross-reference the endpoint context attribute information with entries in a local routing rules database whose entries include mappings of AE address identifiers with data corresponding to various context attributes.

Associate MS 208 subsequently routes the call to a selected destination AE, such as AE 218 (e.g., see message 7). After receiving the call, AE 218 can be configured to display an incoming call alert (e.g., see message 8). Such a call alert can be a visual display and/or audible signal that prompts an associate user 220 (e.g., user of AE 218) to select an answer button (e.g., see message 9) in order to receive the call and ultimately establish a media session connection. After the answer button is interfaced/activate by associate user 220, AE 218 sends a response message, such as an "associateUser URI" message (e.g., see message 10) containing an address identifier of associate user 220, to associate MS 208. In some embodiments, the address identifier can be a uniform resource identifier (URI) address that corresponds to the AE 218 and/or associate user 220.

Accordingly, associate MS 208 forwards the message containing the associate user URI information to PSTN MS 206, which then begins to establish a WebSocket connection with the signaling engine (SE) MS 212. For example, PSTN MS 206 generates and sends a Web RTC message, such as a JSON RTC connection request message, to SE 212 to establish the WebSocket connection. After receiving a response from SE 212, PSTN MS 206 sends a JSON RTC start request message to SE 212.

After receiving the start request message, SE 212 sends an SDP request message (for AE 218) to ME MS 214. ME MS 214 responds with an SDP message, which is used by the endpoint to negotiate the parameters of the media channel, e.g. which codec to transmit the media. The SDP message also prompts SE 212 to send a JSON RTC start request message to AE 218. AE 218 responds with a JSON RTC response message. In response, SE MS 212 then sends an SDP message to ME MS 214. After receiving an SDP message from ME MS 214, SE 212 sends a JSON RTC start response message back to PSTN MS 206 as a reply to the initial JSON start request message. In response, PSTN MS 206 is triggered to communicate a 200 SIP INVITE acknowledge message to PSTN vendor 204 (via a PSTN SIP trunk). PSTN vendor 204 subsequently sends an acknowledgement message to PSTN MS 206 to finalize the media connection between endpoint 202 and AE 218.

FIG. 3 is a flow chart illustrating an exemplary process or method 300 for establishing a communication session between a PSTN endpoint and a WebRTC endpoint according to an embodiment of the subject matter described herein. In some embodiments, method 300 as depicted in FIG. 3 is an algorithm stored in memory that when executed by a hardware processor performs one or more of blocks 302-308.

In block 302, a SIP based signaling message is received from a PSTN endpoint by a public switched telephone network (PSTN) microservice (MS). In some embodiments, a PSTN receives a SIP INVITE message from the PSTN endpoint device. Notably, the SIP INVITE message may traverse through a firewall, a load balancer, and an ESBC MS (in the external host domain of the CCE) prior to reaching the PSTN MS (in the internal host domain of the CCE system).

In block 304, endpoint context attribute information is acquired by the PSTN MS from the SIP based signaling message. In some embodiments, the PSTN MS parses the headers of a received SIP INVITE message to extract "to" and "from" data from the signaling message. The PSTN MS pushes the endpoint context attribute information to an associate MS that is provisioned with routing rules. In response to receiving the endpoint context attribute information, the associate MS access a local routing rules database and locates an address identifier that corresponds to the target AE and provides the identifier to the PSTN MS. The address identifier may be a URI corresponding to the target AE.

In block 306, a Web real-time communications (WebRTC) based signaling message that includes the address identifier of an associate endpoint (AE) that is associated with the endpoint context attribute information is generated by the PSTN MS. In some embodiments, the PSTN MS generates a Web RTC message, such as a JSON RTC message, that requests a communication session with the target AE corresponding to the address identifier.

In block 308, the WebRTC based signaling message is transmitted by the PSTN MS to the AE to initiate a call session between the PSTN endpoint and the AE. In some embodiments, the PSTN MS directs the JSON RTC message to the AE destination to establish the call session between the AE and the sending PSTN endpoint.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
receiving, by a public switched telephone network (PSTN) microservice (MS), a session initiation protocol (SIP) based signaling message from a PSTN endpoint, wherein the PSTN MS initiates a WebSocket connection with a signaling engine (SE) in response to receiving the SIP based signaling message;
acquiring, by the PSTN MS, endpoint context attribute information from the SIP based signaling message, wherein the endpoint context attribute information includes access number information corresponding to an associate endpoint (AE) that is a directed recipient of the SIP based signaling message, wherein acquiring the endpoint context attribute information includes parsing a header section of the SIP based signaling message to obtain origin and/or destination information and call type information that is used to generate the endpoint context attribute information;
generating, by the PSTN MS, a web real time communications (WebRTC) based signaling message that includes an address identifier of the AE that is associated with the context attribute information; and
transmitting, by the PSTN MS, the WebRTC based signaling message to the AE to initiate a call session between the PSTN endpoint and the AE.

2. The method of claim 1 wherein the address identifier of the AE is acquired in response to pushing the endpoint context attribute information to an associate microservice associated with the AE via a representation state transfer (REST) application programming interface (API).

3. The method of claim 2 wherein the PSTN MS sends a join queue request to the AE in response the endpoint context attribute information is pushed via the REST API.

4. The method of claim 1 wherein the PSTN MS converts the SIP signaling message to a JavaScript Object Notation (JSON) protocol signaling message that is recognized by the AE.

5. The method of claim 4 wherein the JSON protocol signaling message is a conversation start request message that initiates the call session with the AE.

6. A system comprising:
a cloud communication environment (CCE) comprising at least one processor and memory; and
a public switched telephone network (PSTN) microservice (MS) stored in the memory and when executed by the at least one processor is configured to receive a session initiation protocol (SIP) based signaling message from a PSTN endpoint, wherein the PSTN MS initiates a WebSocket connection with a signaling engine (SE) in response to receiving the SIP based signaling message, acquire endpoint context attribute information from the SIP based signaling message, wherein the endpoint context attribute information includes access number information corresponding to an associate endpoint (AE) that is a directed recipient of the SIP based signaling message, wherein the PSTN MS acquires the endpoint context attribute information by parsing a header section of the SIP based signaling message to obtain origin and/or destination information and call type information that is used to generate the endpoint context attribute information, generate a Web real time communications (WebRTC) based signaling message that includes an address identifier of the AE that is associated with the context attribute information, and transmit the WebRTC based signaling message to the AE to initiate a call session between the PSTN endpoint and the AE.

7. The system of claim 6 wherein the address identifier of the AE is acquired in response to pushing the endpoint context attribute information to an associate microservice associated with the AE via a representation state transfer (REST) application programming interface (API).

8. The system of claim 7 wherein the PSTN MS sends a join queue request to the AE in response the endpoint context attribute information is pushed via the REST API.

9. The system of claim 6 wherein the PSTN MS converts the SIP signaling message to a JavaScript Object Notation (JSON) protocol signaling message that is recognized by the AE.

10. The system of claim 9 wherein the JSON protocol signaling message is a conversation start request message that initiates the call session with the AE.

11. A non-transitory computer readable medium having stored thereon executable instructions that when executed by a processor of a computer controls the computer to perform steps comprising:

receiving, by a public switched telephone network (PSTN) microservice (MS), a session initiation protocol (SIP) based signaling message from a PSTN endpoint, wherein the PSTN MS initiates a WebSocket connection with a signaling engine (SE) in response to receiving the SIP based signaling message;

acquiring, by the PSTN MS, endpoint context attribute information from the SIP based signaling message, wherein the endpoint context attribute information includes access number information corresponding to an associate endpoint (AE) that is a directed recipient of the SIP based signaling message, wherein acquiring the endpoint context attribute information includes parsing a header section of the SIP based signaling message to obtain origin and/or destination information and call type information that is used to generate the endpoint context attribute information;

generating, by the PSTN MS, a Web real time communications (WebRTC) based signaling message that includes an address identifier of the AE that is associated with the context attribute information; and transmitting, by the PSTN MS, the WebRTC based signaling message to the AE to initiate a call session between the PSTN endpoint and the AE.

12. The non-transitory computer readable medium of claim 11 wherein the address identifier of the AE is acquired in response to pushing the endpoint context attribute information to an associate microservice associated with the AE via a representation state transfer (REST) application programming interface (API).

13. The non-transitory computer readable medium of claim 12 wherein the PSTN MS sends a join queue request to the AE in response the endpoint context attribute information is pushed via the REST API.

14. The non-transitory computer readable medium of claim 11 wherein the PSTN MS converts the SIP signaling message to a JavaScript Object Notation (JSON) protocol signaling message that is recognized by the AE.

* * * * *

UNITED STATES PATENT AND TRADEMARK OFFICE
CERTIFICATE OF CORRECTION

PATENT NO. : 11,095,691 B2  
APPLICATION NO. : 16/453952  
DATED : August 17, 2021  
INVENTOR(S) : Zhang et al.

Page 1 of 2

It is certified that error appears in the above-identified patent and that said Letters Patent is hereby corrected as shown below:

On the Title Page

On page 2, Column 2, item (56) under Other Publications, Line 9, delete "on the Application on the Application" and insert -- on the Application --, therefor.

On page 2, Column 2, item (56) under Other Publications, Line 12, delete "WebRT" and insert -- WebRTC --, therefor.

On page 3, Column 1, item (56) under Other Publications, Line 32, delete "Signalling" and insert -- Signaling --, therefor.

On page 3, Column 1, item (56) under Other Publications, Line 42, delete "University" and insert -- Universal --, therefor.

On page 3, Column 1, item (56) under Other Publications, Line 57, delete "Opearitng" and insert -- Operating --, therefor.

On page 3, Column 1, item (56) under Other Publications, Line 61, delete "Interopearbility,"" and insert -- Interoperability," --, therefor.

On page 3, Column 2, item (56) under Other Publications, Line 14, delete "2006347431" and insert -- 2006247431 --, therefor.

On page 3, Column 2, item (56) under Other Publications, Line 24, delete "Hadnely" and insert -- Handley --, therefor.

On page 3, Column 2, item (56) under Other Publications, Line 26, delete "Part" and insert -- Party --, therefor.

On page 3, Column 2, item (56) under Other Publications, Line 35, delete "2326" and insert Signed and Sealed this  
Twenty-fifth Day of January, 2022

Drew Hirshfeld  
*Performing the Functions and Duties of the  
Under Secretary of Commerce for Intellectual Property and  
Director of the United States Patent and Trademark Office*

-- 2327 --, therefor.

On page 3, Column 2, item (56) under Other Publications, Line 44, delete "Euroepean" and insert -- European --, therefor.

On page 3, Column 2, item (56) under Other Publications, Line 57, delete ""Architectual" and insert -- "Architectural --, therefor.

In the Specification

In Column 5, Line 7, delete "EBSC" and insert -- ESBC --, therefor.

In Column 6, Line 31, delete "(VM)" and insert -- (VMs) --, therefor.

In Column 6, Line 59, delete ""+64×xx"" and insert -- "+64xxx" --, therefor.

In Column 10, Line 14, delete "EBSC" and insert -- ESBC --, therefor.

In Column 10, Line 18, delete "EBSC" and insert -- ESBC --, therefor.